US011144660B2

(12) United States Patent
Latka et al.

(10) Patent No.: US 11,144,660 B2
(45) Date of Patent: Oct. 12, 2021

(54) SECURE DATA SHARING

(71) Applicant: SAP SE, Walldorf (DE)

(72) Inventors: Oliver Latka, Munich (DE); Anja Wilbert, Munich (DE); Georg Kreimer, Munich (DE); Denise Wildner, Munich (DE); Jose Enrique Gonzalez Modecir, Munich (DE)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 16/203,178

(22) Filed: Nov. 28, 2018

(65) Prior Publication Data

US 2020/0117818 A1 Apr. 16, 2020

(30) Foreign Application Priority Data

Oct. 10, 2018 (EP) ..................................... 18199567

(51) Int. Cl.
*G06F 21/62* (2013.01)
*G06F 16/182* (2019.01)
(Continued)

(52) U.S. Cl.
CPC ...... *G06F 21/6218* (2013.01); *G06F 12/1408* (2013.01); *G06F 12/1466* (2013.01);
(Continued)

(58) Field of Classification Search
CPC ....... H04L 9/0637; H04L 9/3247; H04L 9/32; H04L 9/321; H04L 9/16; H04L 9/121; H04L 9/082; H04L 9/08; H04L 9/0844; H04L 9/0825; H04L 63/123; H04L 63/12; G06F 21/602; G06F 21/6218;
(Continued)

(56) References Cited

U.S. PATENT DOCUMENTS 10,095,888 B1 * 10/2018 Lee .......................... G06F 21/64
2007/0244899 A1 * 10/2007 Faitelson ............ G06F 21/6236
(Continued)

FOREIGN PATENT DOCUMENTS

CN 108471350 A 8/2018

OTHER PUBLICATIONS

Swan, Merlanie "Blockchain: Blueprint for a New Economy", In: Blockchain: Blueprint for a New Economy, Feb. 8, 2015 (Feb. 8, 2015), O'Reilly, XP055279098, ISBN: 978-1-4919-2049-7,142pgs.
(Continued)

*Primary Examiner* — Kristine L Kincaid
*Assistant Examiner* — Shaqueal D Wade
(74) *Attorney, Agent, or Firm* — Buckley, Maschoff & Talwalker LLC

(57) ABSTRACT

A computer-implemented method is provided for secure data sharing. The method comprises: storing, by a data owner or an entity authorized by the data owner, via a data management user interface, in a decentralized data storage, data in an encrypted format; storing, via the data management user interface, in a blockchain, information indicating the data owner and a reference to the data stored in the decentralized data storage; and storing, by the data owner, via the data management user interface, in the blockchain, information indicating consent given to one or more authorized users for using the data.

20 Claims, 8 Drawing Sheets

(51) Int. Cl.
    *G06F 16/14* (2019.01)
    *G06F 12/14* (2006.01)
    *G06F 21/31* (2013.01)
    *G06F 21/60* (2013.01)
    *H04L 9/06* (2006.01)
    *H04L 9/08* (2006.01)

(52) U.S. Cl.
    CPC .......... *G06F 16/152* (2019.01); *G06F 16/182* (2019.01); *G06F 21/31* (2013.01); *G06F 21/604* (2013.01); *H04L 9/0637* (2013.01); *H04L 9/0844* (2013.01); *G06F 2221/2137* (2013.01); *G06F 2221/2141* (2013.01); *H04L 2209/38* (2013.01)

(58) Field of Classification Search
    CPC .... G06F 21/62; G06F 21/6227; G06F 16/158; G06F 16/152; G06Q 30/0204; G06Q 30/0269
    See application file for complete search history.

(56) References Cited

U.S. PATENT DOCUMENTS

| | | | |
|---|---|---|---|
| 2016/0026377 A1* | 1/2016 | Dreicer | G06F 40/18 715/772 |
| 2017/0277775 A1* | 9/2017 | Eigner | G06F 40/123 |
| 2018/0082296 A1 | 3/2018 | Brashers | |
| 2019/0018887 A1* | 1/2019 | Madisetti | H04L 9/3236 |
| 2019/0348158 A1* | 11/2019 | Livesay | H04L 9/0891 |
| 2019/0370358 A1* | 12/2019 | Nation | H04L 9/0643 |
| 2020/0034553 A1* | 1/2020 | Kenyon | G06F 21/6218 |
| 2020/0084046 A1* | 3/2020 | Bessonov | H04L 9/3239 |
| 2020/0092292 A1* | 3/2020 | Patel | H04L 9/32 |

OTHER PUBLICATIONS

"Communication: European Search Report", dated Jan. 17, 2019 (dated Jan. 17, 2019), European Patent Office, for European Application No. 18199567.1-1218, 25pgs.

* cited by examiner

SECURE DATA SHARING

CROSS-REFERENCE TO RELATED APPLICATIONS

The present application claims priority under 35 U.S.C. § 119(a) to EP Patent Application No. 18199567.1, filed Oct. 10, 2018, the contents of which are incorporated herein by reference for all purposes.

BACKGROUND

The present application relates to a computer-implemented method, a client device and a computer program product for secure data sharing.

In some circumstances, an owner of data does not always have a full control over the use of his/her own data. For example, personal data such as health and/or vital data may be collected via a service (e.g., web application) provided by a specific vendor and the collected data may be managed within the service of the specific vendor. Accordingly, it may be difficult for the data owner to use the collected data outside the service, even though the collected data is his/her own data.

Further, when data stored and/or managed by a single entity, concerns regarding availability and/or security of the data may arise. For instance, the data may become inaccessible due to a technical failure at the data storage system of the entity and/or merely due to a decision made by the entity to deny access to the data. Further, for example, the data may be breached by a malicious third party with a cyberattack.

BRIEF DESCRIPTION

According to an aspect, the problem relates to improving security and flexibility in data sharing. The problem is solved by the features disclosed by the independent claims. Further exemplary embodiments are defined by the dependent claims.

According to an aspect, a computer-implemented method is provided for secure data sharing. The method comprises:
  storing, by a data owner or an entity authorized by the data owner, via a data management user interface, in a decentralized data storage, data in an encrypted format;
  storing, via the data management user interface, in a blockchain, information indicating the data owner and a reference to the data stored in the decentralized data storage; and
  storing, by the data owner, via the data management user interface, in the blockchain, information indicating consent given to one or more authorized users for using the data.

In various embodiments and examples described herein, the "data management user interface" may be a user interface provided by a software application for managing data. The software application may be installed on a client device. In some examples, the software application may be a web application that can be run in a web browser.

In various embodiments and examples described herein, the term "decentralized data storage" may be understood as a data storage that comprises a network of storage devices without any central point of storage.

In various embodiments and examples described herein, the term "blockchain" may be understood as a distributed electronic ledger implemented using the blockchain technology. More specifically, the blockchain may be an electronic ledger that is shared among a plurality of nodes (e.g. computers) constituting a network, wherein each node can directly access (e.g. read and write) the ledger. From some perspective, the blockchain may be considered as a distributed database. A blockchain can be understood as a distributed system in which there is no central administrator. Each node can keep a copy of a "ledger" (i.e., record of transactions) and the copy of the ledger kept by each node is identical to every other node's copy, so that the set of copies can be referred to as a single source of truth. In other words, the blockchain may be understood as being replicated on all the nodes. A blockchain is reliable and transparent, in that transactions are permanently recorded and cannot be revised. For example, data stored in a blockchain cannot be altered or deleted without leaving a trace. Exemplarily, timestamps may be used for this purpose, since a timestamp proves that the data must have existed at the time. The term "transaction" may be used herein to indicate an action or a process that includes one or more changes to the ledger that modify the state of the blockchain. In the following, the term "transaction" will be used to refer both to the action itself and to a definition of the transaction that may be a collection of entities needed for performing the action, such as statements, variables and/or parameters. When a node "sends a transaction" to the blockchain distributed ledger the node may access the ledger in accordance to the action specified in the transaction, e.g., write and/or update the data. By "recording a transaction" in the blockchain, a log of the action performed (e.g., transaction involving writing and/or updating of data) and/or the definition of the transaction may be recorded in the ledger.

In various embodiments and examples described herein, "storing" information in a blockchain (e.g., "storing . . . information indicating the data owner and a reference to the data"; "storing . . . information indicating consent given to one or more authorized users") may result in recording a "transaction" in the blockchain, where the transaction indicates the action of storing the information. The transaction may further include the content of the stored information.

In the blockchain technology, transactions are grouped into so-called blocks, which will eventually be, after validation via a consensus algorithm, chained together over time in a so-called blockchain. The blocks may be seen as forming a chain because each block contains a reference to the previous block, for example each block contains a hash value of a previous block and a timestamp of when the previous block has been added to the chain.

The validity of a transaction may be verified in the consensus process by checking a digital signature of the transaction. Each node in the network may be associated with an identifier and be provided with a cryptographic pair, private key-public key. All the nodes in the network may have a list of the public keys and the respective identifiers of the other nodes. When a node sends a transaction to the blockchain network, the node signs the transaction with its private key. The transaction may then be broadcast to the other nodes within the network. Thus, the other nodes, using the public key associated with the identifier, can verify the digital signature to check that the communication has not been tampered with. Once the validity of the transaction has been ascertained, the other nodes may create a new block comprising the transaction, signing the block with their private keys, so that the block can be deployed to the blockchain. The consensus process may be carried out by all nodes or only by a pre-selected set of nodes. This means that it may be necessary for all the nodes to sign the block, or only for a part of them.

In the above-stated method, one of the one or more authorized users may be the entity authorized by the data owner to store the data in the decentralized data storage.

The above-stated method for secure data sharing may further comprise:

receiving, via the data management user interface, a request from a data requester to enable use of the data stored in the decentralized data storage;

determining, via the data management user interface, with reference to the blockchain, whether the data requester is the data owner or one of the one or more authorized users; and when the data requester is determined to be the data owner or one of the one or more authorized users, retrieving the data for use by the data requester, via the data management user interface, from the decentralized data storage, using the reference to the data.

In the above-stated method for secure data sharing, the information indicating consent given to the one or more authorized users may include one or more time periods in which the one or more authorized users are allowed to use the data; and wherein the method may further comprise:

when the data requester is determined to be one of the one or more authorized users, determining, via the data management interface, with reference to the blockchain, whether a current time is within the time period in which said one of the one or more authorized users is allowed to use the data; and retrieving the data for use by the data requester, via the data management user interface, from the decentralized data storage, when the current time is determined to be within the time period in which said one of the one or more authorized users is allowed to use the data.

Further, the above-stated method for secure data sharing may further comprise:

storing, by the data owner, via the data management user interface, in the blockchain, information indicating cancellation of the consent given to at least one of the one or more authorized users, wherein, the data may not be made available for use by the data requester in case the data requester is said at least one of the one or more authorized users for whom the consent is cancelled.

Further, the above-stated method for secure data sharing may further comprise:

decrypting, via the data management user interface, the retrieved data using a key used for encrypting the data stored in the decentralized data storage.

In some examples, the above-stated method for secure data sharing may further comprise:

when storing the information indicating consent given to the one or more authorized users, encrypting using a key of each of the one or more authorized users, the key used for encrypting the data stored in the decentralized data storage, wherein the key of each of the one or more authorized users may be a public key of each of the one or more authorized users; and storing the encrypted key in the blockchain together with the information indicating consent given to the one or more authorized users.

In various embodiments and examples described herein, the term "public key" may be understood in the context of the public-key cryptography that enables a sender of data to encrypt and/or digitally sign the data with his/her private key and a receiver of the data to decrypt the data and/or verify the digital signature with a public key corresponding to the private key of the sender. A trust center may be established to verify identification information of users (e.g. potential senders of data) and issue digital certificates each of which certifies that a particular public key belongs to a particular user.

In some examples, the key used for encrypting the data stored in the decentralized data storage may be exchanged according to Diffie-Hellman key exchange.

The Diffie-Hellman key exchange is a known method of securely exchanging cryptographic keys over a public channel.

In some further examples, the above-stated method for secure data sharing may further comprise:

encrypting the data, via the data management user interface, using a key of each of the one or more authorized users before storing the data in the decentralized data storage, wherein the key of each of the one or more authorized users may be a public key of each of the one or more authorized users.

Further, in the above-stated method and various examples, the decentralized data storage may be implemented according to InterPlanetary File System™, IPFS, protocol and the reference to the data may be a hash of the data obtained according to the IPFS protocol.

In some other examples, the decentralized data storage may be implemented using one of the following:

Filecoin™;
Sia™;
Storj™; or
Swarm™.

Further, the data management user interface may be implemented for use on an electronic device of the data owner and/or the data requester.

According to another aspect, a client device is provided for secure data sharing. The client device comprises a data management interface adapted to perform the method according to any one of the above-stated aspect and examples.

According to yet another aspect, a computer program product is provided. The computer program product comprises computer-readable instructions that, when loaded and run on a computer, cause the computer to perform the method according to any one of the above-stated aspect and examples.

According to one or more of the above-stated aspects and various examples, in some circumstances, one or more of the following technical effects may be achieved:

improved security of data;
ownership of data being kept for the data owner;
no lock into a specific vendor (e.g., no data silos, improving data portability)
manipulation of data being impossible or almost impossible by the use of the decentralized data storage and the blockchain;
enabling decentralized marketing;
enabling democratization of data;
ensuring transparency of data usage;
allowing Minimal disclosure for personal data;
enabling managed and secured seamless exchange of data between different parties (e.g. services and product offerings) that may be dependent on user data ensuring accessibility to solely required data sets.

The subject matter described in the application can be implemented as a method or as a system, possibly in the form of one or more computer program products. The subject matter described in the application can be implemented in a data signal or on a machine readable medium, where the medium is embodied in one or more information carriers, such as a semiconductor memory or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION

Figure 1:
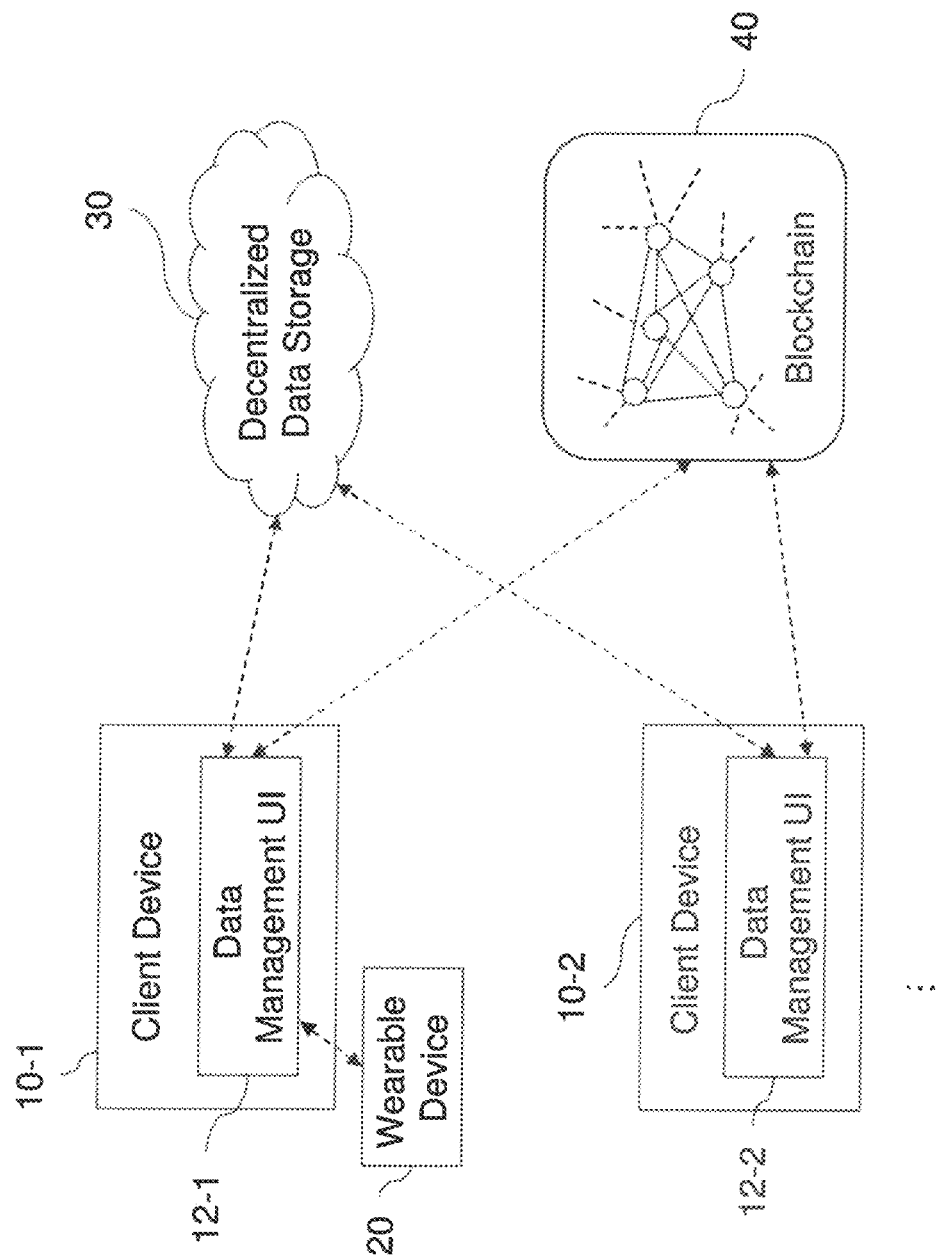
FIG. 1 shows an exemplary system architecture for secure data sharing.

In the following text, a detailed description of examples will be given with reference to the drawings. It should be understood that various modifications to the examples may be made. In particular, one or more elements of one example may be combined and used in other examples to form new examples.
System Architecture FIG. 1 shows an exemplary system architecture for secure data sharing. As shown in FIG. 1, one or more client devices 10-1, 10-2, . . . (hereinafter, also simply referred to as the "client device 10") may be connected to a decentralized data storage 30 and a blockchain 40 via a network (not shown) such as the Internet.

The client device 10 may be a computer such as a personal computer. In some examples, the client device 10 may be a mobile device such as mobile phone (e.g. smartphone), a tablet computer, a laptop computer, a personal digital assistant (PDA), etc.

The client device 10 may include a data management user interface (UI) 12. The data management UI 12 may be a user interface provided by a software application for managing data. More specifically, the data management UI 12 may be configured to store data in the decentralized data storage 30 and to store information related to the data in the blockchain 40, in response to one or more user inputs. The data management UI 12 may be further configured to perform actions (e.g., read, write, etc.) on the data stored in the decentralized data storage 30, according to consent given by the data owner. The details of exemplary functions of the data management UI 12 will be described later.

In some examples, the software application that provides the data management UI 12 may be a portal application installed on the client device 10. Alternatively or additionally, the software application may be a web application that can be run in a web browser on the client device 10.

As shown with respect to the client device 10-1 of FIG. 1, the client device 10 may be further connected to a wearable device 20. The wearable device 20 may be a device that can be worn by a human and that may collect data relating to the human who is wearing the device. For example, the wearable device 20 may detect vital information (e.g., heart rate, body temperature, blood pressure, etc.) and/or activities (e.g., movement) made by the human who is wearing the device and collect data concerning the vital information and/or activities. The wearable device 20 may be in a form of a watch or spectacles or any other form that is suitable for being worn by a human. In the present disclosure, the data collected by the wearable device 20 may be provided to the data management UI 12 of the client device 10 to be stored in the decentralized data storage 30.

The decentralized data storage 30 may be a data storage that comprises a network of storage devices without any central point of storage.

In some examples, the decentralized data storage 30 may be implemented according to the InterPlanetary File System™ (IPFS) protocol. The IPFS is a protocol and network designed to create a content-addressable, peer-to-peer method of storing and sharing hypermedia in a distributed file system. IPFS is a peer-to-peer distributed file system that seeks to connect all computing devices with the same system of files. In other words, IPFS provides a high-throughput, content-addressed block storage model, with content-addressed hyperlinks. This forms a generalized Merkle directed acyclic graph (DAG). IPFS combines a distributed hash table, an incentivized block exchange, and a self-certifying namespace. IPFS has no single point of failure, and nodes do not need to trust each other not to tamper with data in transit. A local file can be added to the IPFS, making it available to the world. In the IPFS, files are identified by their hashes and are distributed using a BitTorrent-based protocol. Further details on the IPFS may be found, for example, in Juan Benet, "IPFS Content Addressed, Versioned, P2P File System" (available online at: https://arxiv.org/abs/1407.3561).

In other examples, the decentralized database 30 may be implemented using technologies other than the IPFS. Examples of other technologies that may implement the decentralized database 30 may include, but are not limited to, Filecoin™, Sia™, Storj™ and Swarm™.

The blockchain 40 may include a plurality of nodes (e.g. computers) and be considered as a distributed electronic ledger that is shared among the plurality of nodes constituting a network, wherein each node can directly access (e.g. read and write) the distributed electronic ledger. In some examples, the blockchain 40 may be implemented using a platform called Ethereum™ that is an open-source, public, blockchain-based distributed computing platform and operating system featuring smart contract (scripting) functionality. The smart contract is a computer protocol intended to digitally facilitate, verify, or enforce the negotiation or performance of a contract. Smart contracts allow the performance of credible transactions without third parties. These transactions are trackable and irreversible. It is noted, however, the blockchain 40 may be implemented using a platform other than Ethereum.

In the system shown in FIG. 1, the data to be shared may be stored in the decentralized data storage 30, via the data management UI 12 of the client device 10. Further, information relating to the data to be shared may be stored in the blockchain 40, via the data management UI 12 of the client device 10. The information relating to the data may include, for example, a reference to the data stored in the decentralized data storage 30, identification information of the data owner and/or information indicating consent given by the data owner to one or more authorized users for using the data. Further, access control information indicating which user(s) is (are) authorized to perform which action (e.g. store, read, write, copy, etc.) regarding particular data may also be stored in the blockchain 40.

When the data management UI 12 receives an input from a user to perform an action on the data, the data management UI 12 may access the blockchain 40 to check whether or not the user who has provided the input is the data owner or one of authorized user(s) to perform that action. When it is determined that the user has authorization to perform the action based on the consent information and/or access control information stored in the blockchain 40, the data management UI 12 may access the decentralized data storage 30 to perform that action with respect to the data. For instance, when retrieving the data from the data storage 30, the data management UI 12 may obtain a reference to the data from the blockchain 40 and use the reference for retrieving the data from the data storage 30.

In some examples, the data management UI 12 may be connected to an identity management system (not shown) for identifying the user. For instance, the user may login to the data management UI 12 using credential information registered with the user identity management system and the identification information of the user can be obtained by the data management UI 12 from the identity management system. Further, the information indicating the data owner and the authorized user(s) stored in the blockchain 40 may be in a form of a reference to the identification information managed within the identity management system. An example of such an identity management system may be Gigya™/SAP Customer Data Cloud™. It should be noted, however, Gigya™/SAP Customer Data Cloud™ is merely an example of the identity management system and another identity management system may also be employed in some examples.

Data Flow and Process for Secure Data Sharing

Figure 2:
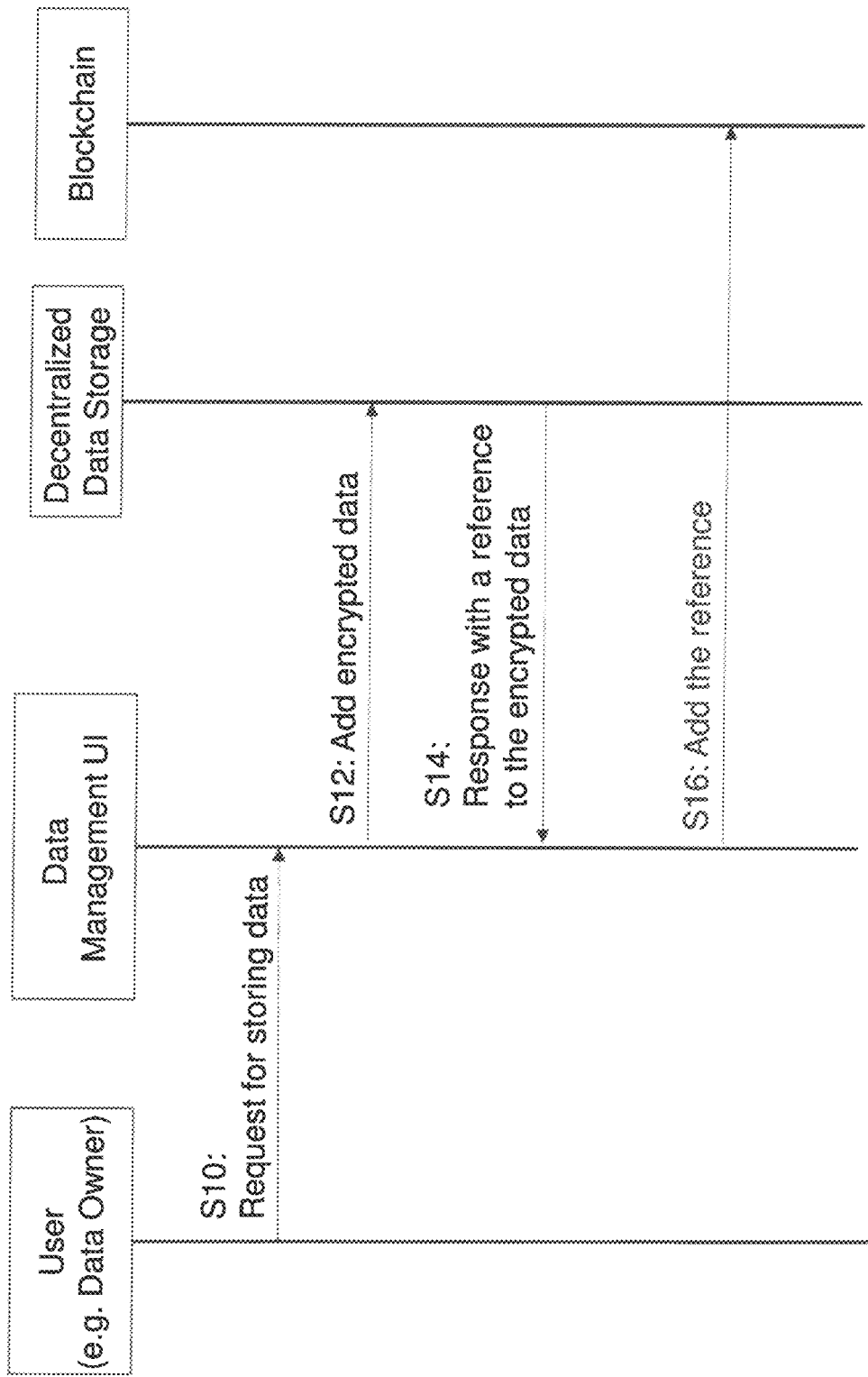
FIG. 2 shows an exemplary data flow for storing data in a decentralized data storage according to the present disclosure.

FIG. 2 shows an exemplary data flow for storing data in a decentralized data storage according to the present disclosure.

First, a user (e.g. a data owner or a user of an entity authorized by the data owner to store data) may request, via the data management UI 12, to store data in the decentralized data storage (step S10). An entity authorized by the data owner to store data may be a person or organization (e.g., doctor, nurse, pharmacist, medical clinic, hospital, university, research institute, etc.) that is authorized by the data owner to store the data in the decentralized data storage. In this example, the data is in an encrypted form. Examples on how the encryption of the data may be performed will be described later.

Next, the data management UI 12 may add (in other word, store) the encrypted data in the decentralized data storage 30 (step S12).

In response to the storing of the encrypted data via the data management UI 12, the decentralized data storage 30 may send a response to the data management UI 12 with a reference to the encrypted data (step S14). In the examples where the decentralized data storage 30 is IPFS, the reference to the encrypted data may be a hash of the data obtained according to the IPFS protocol (an IPFS hash).

Upon receipt of the response with the reference to the encrypted data from the decentralized data storage 30, the data management UI 12 may add (in other word, store) the reference to the blockchain 40 (step S16). In some examples, the reference may be added to the smart contract offered by the blockchain 40.

Figure 3:
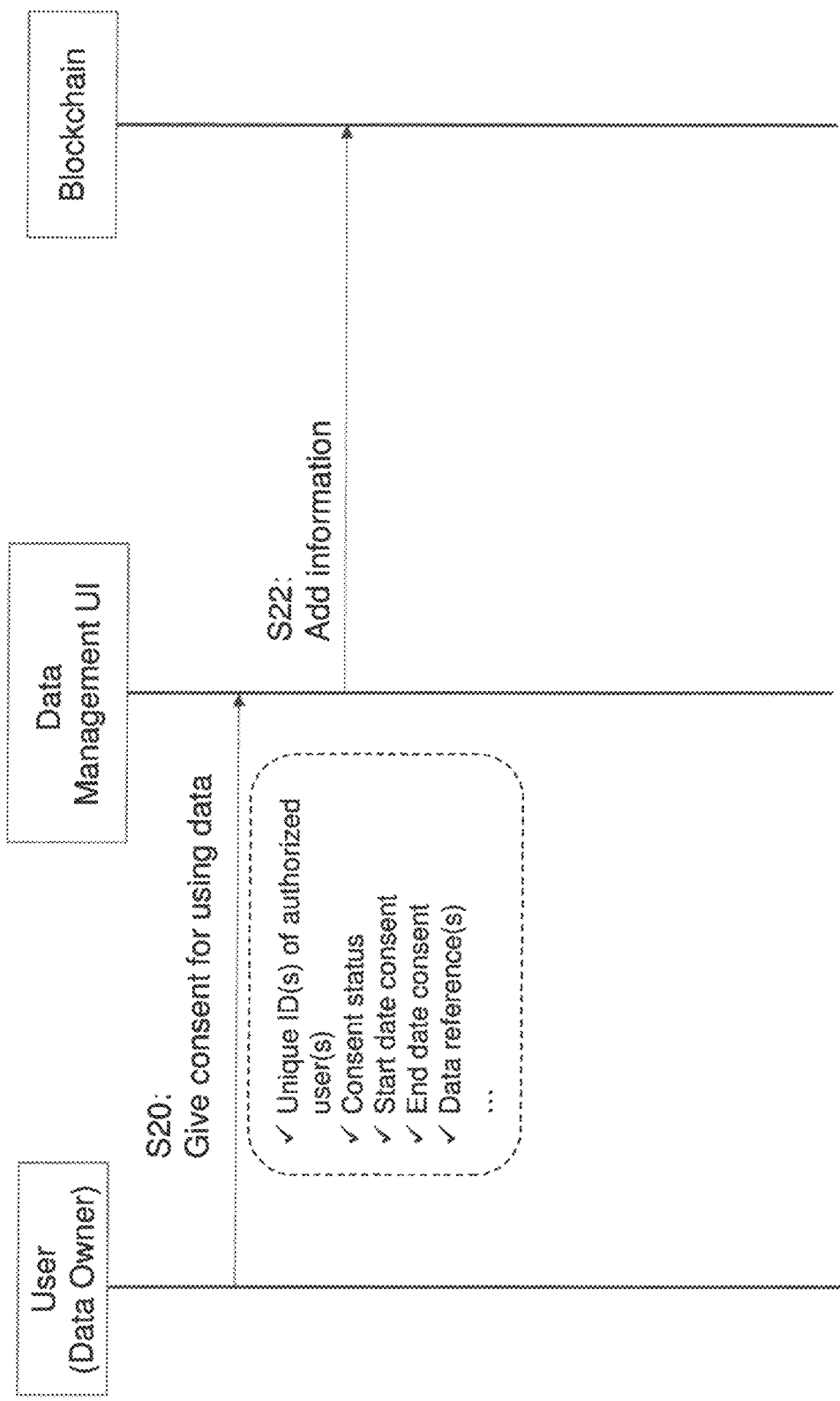
FIG. 3 shows an exemplary data flow for giving consent for using data according to the present disclosure.

FIG. 3 shows an exemplary data flow for giving consent for using data according to the present disclosure.

A user, e.g. the data owner, may give consent to one or more authorized users for using data via the data management UI 12 (step S20). The information indicating the consent may include, for example, unique ID(s) of the authorized user(s), consent status, start date (and optionally time) of the consent, end date (and optionally time) of the consent and/or reference(s) to the data for which the consent is given. The information indicating the consent may further include access control information indicating which authorized user(s) is/are allowed to perform which action(s) to which data. In some examples, items included in the information indicating the consent may be in accordance with General Data Protection Regulation (EU) 2016/679 (GDPR).

The data management UI 12 may then add (in other word, store) the information indicating the consent to the blockchain 40 (step S22). In some example, the information indicating the consent may be added using the smart contract offered by the blockchain 40.

Figure 4:
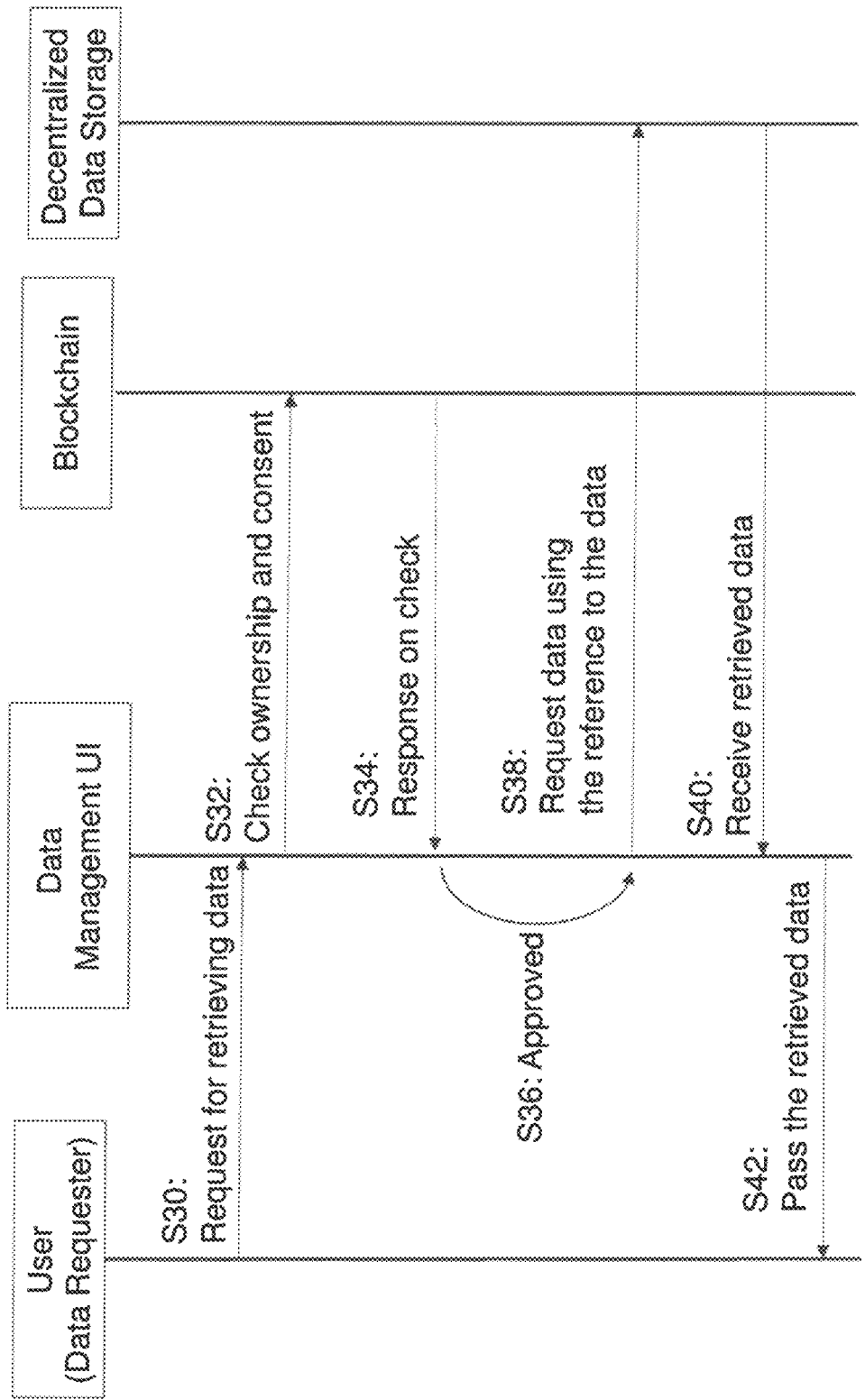
FIG. 4 shows an exemplary data flow for retrieving data from the decentralized data storage according to the present disclosure.

FIG. 4 shows an exemplary data flow for retrieving data from the decentralized data storage according to the present disclosure.

For retrieving data, a user, e.g. a data requester, may request via the data management UI 12 to retrieve data from the decentralized data storage 30 (step S32).

In response to the request, the data management UI 12 may access the blockchain 40 to check ownership of the data and consent given to the data requester concerning the requested data (step S32).

The blockchain 40 may provide a response on the check of the ownership and consent (step S34).

When the response from the blockchain 40 indicates that the data requester is authorized to retrieve data from the decentralized data storage 30 (step S36), the data management UI 12 may request the data to the decentralized data storage, using the reference to the data (step S38). It is noted that the reference to the data can be obtained from the blockchain 40.

The data management UI 12 may then receive the retrieved data from the decentralized data storage (step S40).

The data management UI 12 may pass the retrieved data to the user (step S42).

In some examples, the data management UI 12 may decrypt the retrieved data using a decryption method corresponding to the encryption method used for encrypting the data stored in the decentralized data storage. Examples of the decryption method will be described later.

Although FIG. 4 shows an exemplary data flow for retrieving data from the decentralized data storage 30, an analogous flow may be employed for performing an action other than (merely) retrieving data, for example, storing data, editing data, copying data, etc. In the examples for performing another action on the data, it may be determined whether the user is authorized to perform the action to the data at step S32 and S34 of FIG. 4. If the user is authorized to perform the action, the data management UI 12 may allow the user to perform the requested action on the data at step S42 of FIG. 4, for example.

Figure 5:
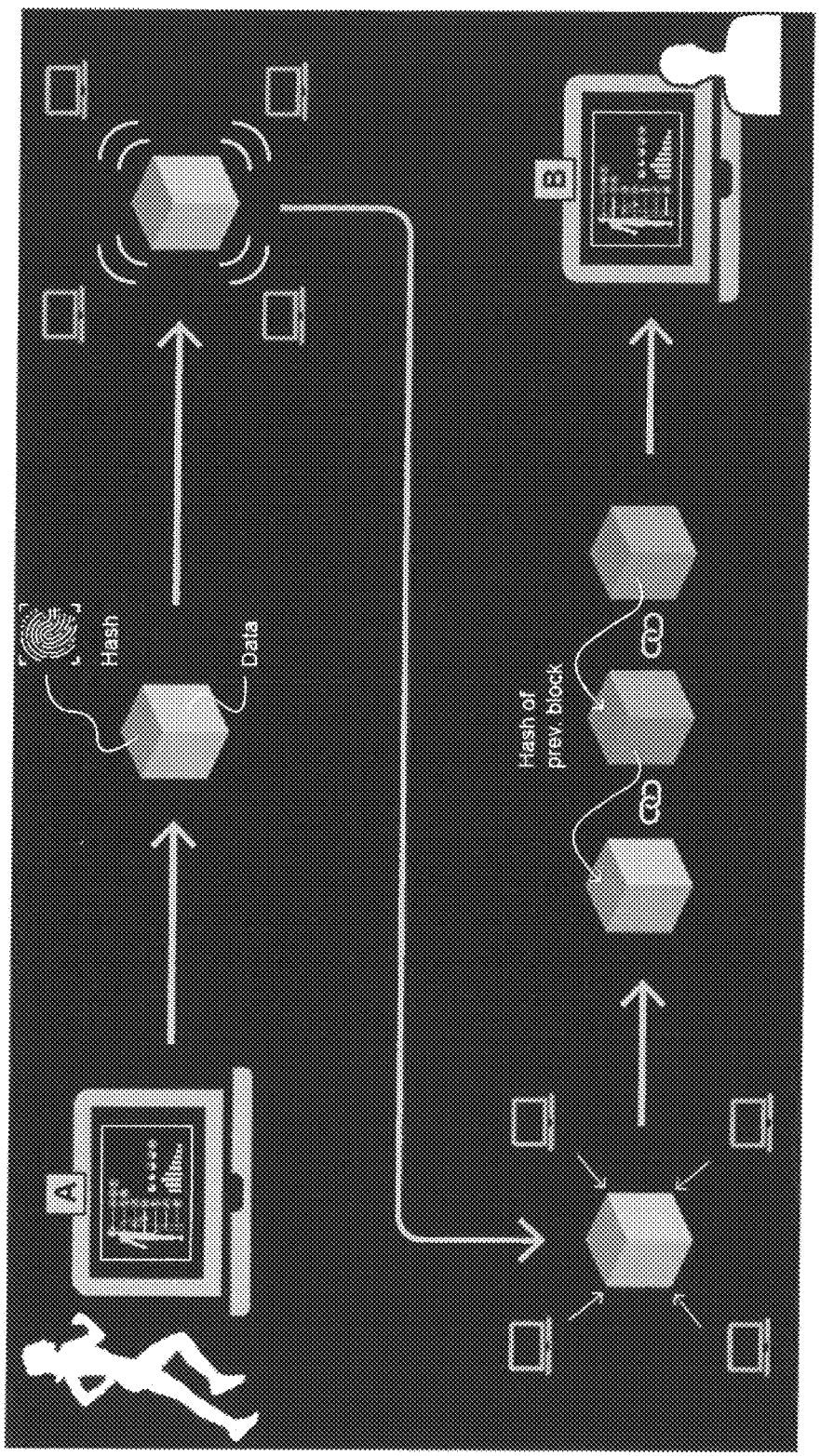
FIG. 5 shows a diagram representing an exemplary process of sending data from a data owner to an authorized user of the data.

FIG. 5 shows a diagram representing an exemplary process of sending data from a data owner to an authorized user of the data. The exemplary process shown in FIG. 5 may correspond to the data flow for giving consent for using data as shown in FIG. 3.

In the various embodiments and examples described herein, the data to be stored in the decentralized data storage 30 may be in an encrypted form. The following provides some examples of the encryption (and corresponding decryption) methods that may be employed in the various embodiments and examples described herein.

For example, the data may be encrypted with a key according to a known encryption method. This key may be encrypted using a key of each authorized user and the encrypted key may be stored in the blockchain 40 together with the information indicating consent given to the authorized user(s). Each authorized user may then decrypt the encrypted key using his/her key and then decrypt the data using the decrypted key. In this example, the key of each authorized user may be a public/private key pair (e.g., the public key for encrypting and private key for decrypting).

Further, for example, the data may be encrypted with a key that is exchanged between the data owner and the authorized user according to Diffie Hellman key exchange. The authorized user may use the exchanged key to decrypt the data.

Further, for example, the data may be encrypted using a key of each authorized user before storing the data in the decentralized data storage. The key of each authorized user may be a public key of the authorized user.

It should be noted that the above-stated examples for encryption/decryption are mere examples and an encryption/decryption method other than the above-stated examples may also be employed for encrypting/decrypting data stored in the decentralized data storage 30.

Exemplary Use Cases

The following provides exemplary use cases of secure data sharing according to the present disclosure.

Figure 6A:
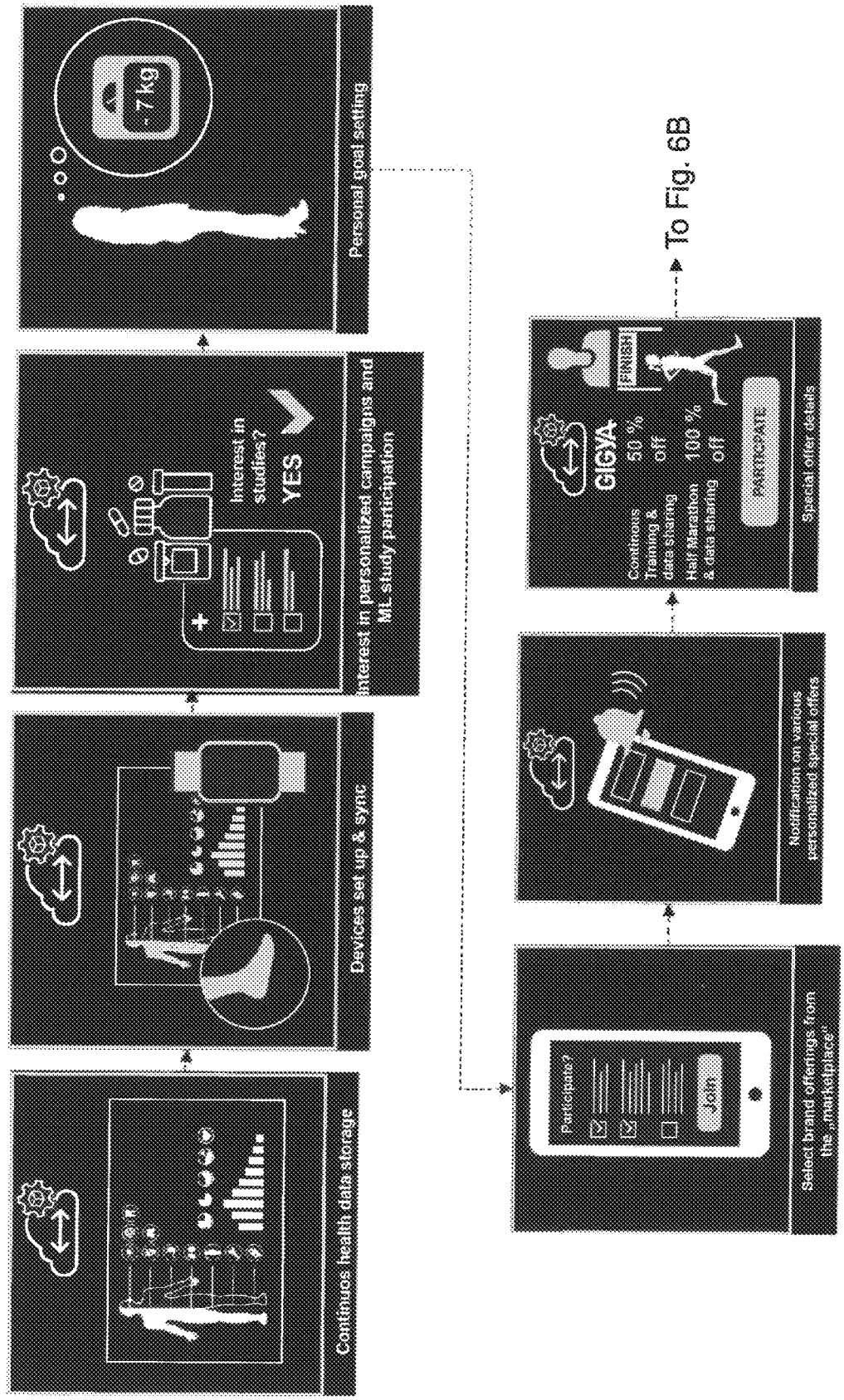
FIGS. 6A and 6B show an exemplary use case of secure data sharing according to the present disclosure.
Figure 6B:
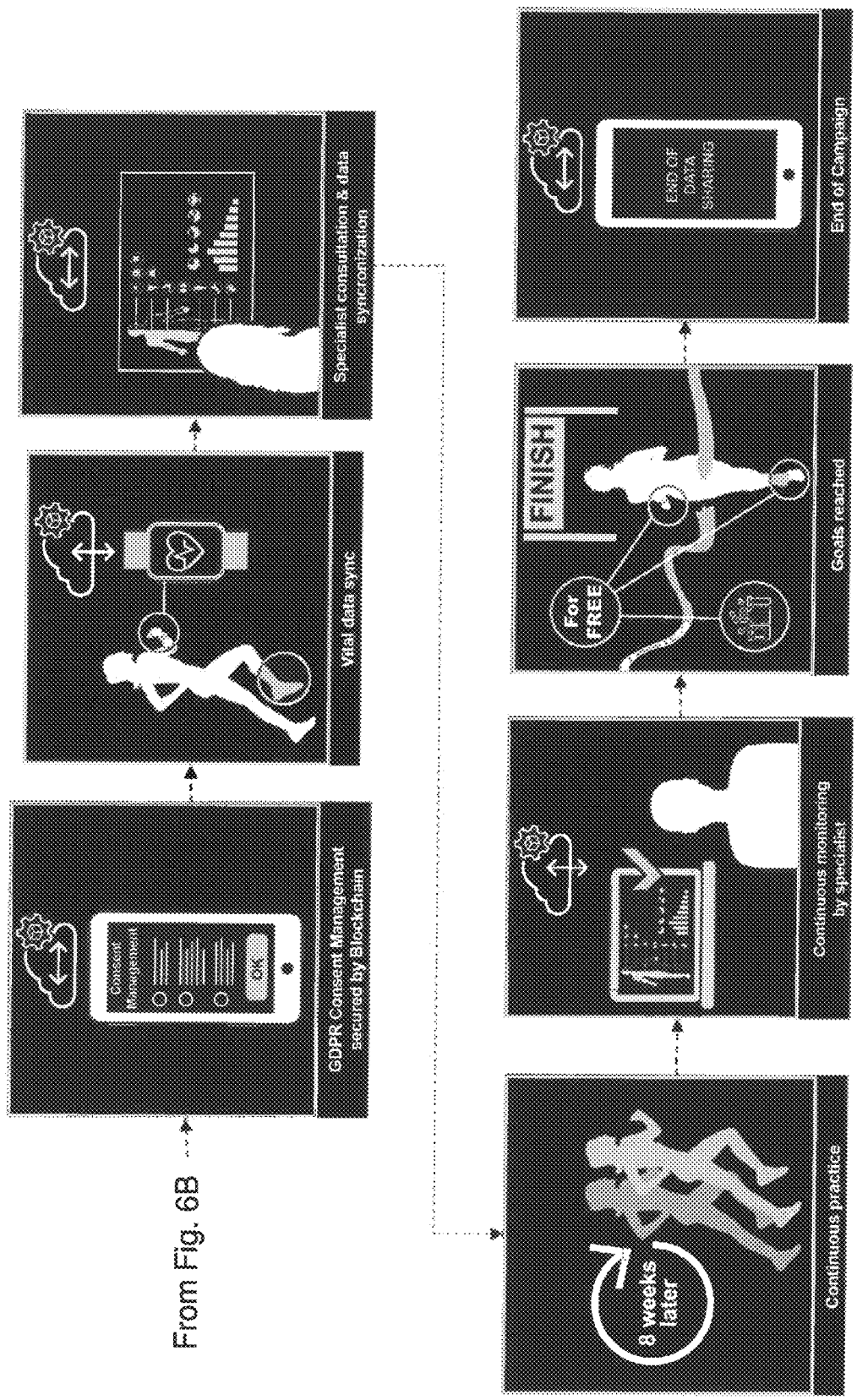

FIGS. 6A and 6B show an exemplary use case of secure data sharing according to the present disclosure. The exemplary use case shown in FIGS. 6A and 6B relates to the use of health data of a user having a fitness tracker (an example of the wearable device 20). The health data of the user may be stored in the decentralized data storage 30 and the user may give consent to the campaigner for using at least a part of the health data, according to the present disclosure. The campaigner may use the part of the health data and send notification on various personalized special offers.

In another example, everybody may have access to a private portal (mobile, desktop, etc.). In this portal, the entire users' specific health record, history, and data may be stored. Upon request by a third party (e.g. doctor, pharmacy, physician, etc.), the user may be able to verify the requested data set and share it for a certain timeframe, with personal data or anonymized (e.g. according to the GDPR). Shared data may be used to proceed prescriptions, payments or treatments or other. The user may be able to receive loyalty benefits for sharing information for common machine learning (ML) database learning and knowledge.

Further, in an exemplary use case of handling health information, during a doctor's appointment there might be a request to send and receive data between the doctor and the patient. The doctor can edit and enter the details in the portal used by him and this finalized request will generate a code. The patient can scan this code and within the UI of his device he will see a list of the requested data. This data can be pulled from the patients portal record. The patient may be able to manage all requested data sets individually whether to share (timeframe, anonymized) or not to share. The patient will see if he'd gain loyalty points for sharing. The doctor can store the received data in the patients record or manage the anonymized data for machine learning.

Further, after the appointment at the doctor, the patient may receive a list with further prescriptions and how to use information. All prescriptions may be sent to the patient automatically except of different request (closest pharmacy with availability nearby) or closets location for individual adjustments (orthopedic, dental) with appointment suggestion. Prescribed items may be processed to pharmacy or any other 3rd party provider and payment may be processed to insurance company.

Possible Advantages

Possible advantages of one or more of the various embodiments and examples described herein may include one or more of the following:

Decentralization may open new possibilities for services, which could not be implemented before;

The encryption of publicly available data (in the decentralized data storage) may improve data security;

The use of the data management user interface may facilitate access and management of the decentralized user data;

All services for management may be written in a smart contract on the blockchain;

A common identity layer may be used for personal user data storage, providing accessibility for even other providers if the consent is given;

Democratized marketing may be enabled;

Since working with decentralized services, the portal may need to be programmed asynchrony, to react on changes without block the whole portal while the data will be processed. The timeframe for processing data may not be fixed due to the decentralized architecture, because other products could also use the service and all tasks may get processed in a certain manner.

Hardware Configuration

Figure 7:
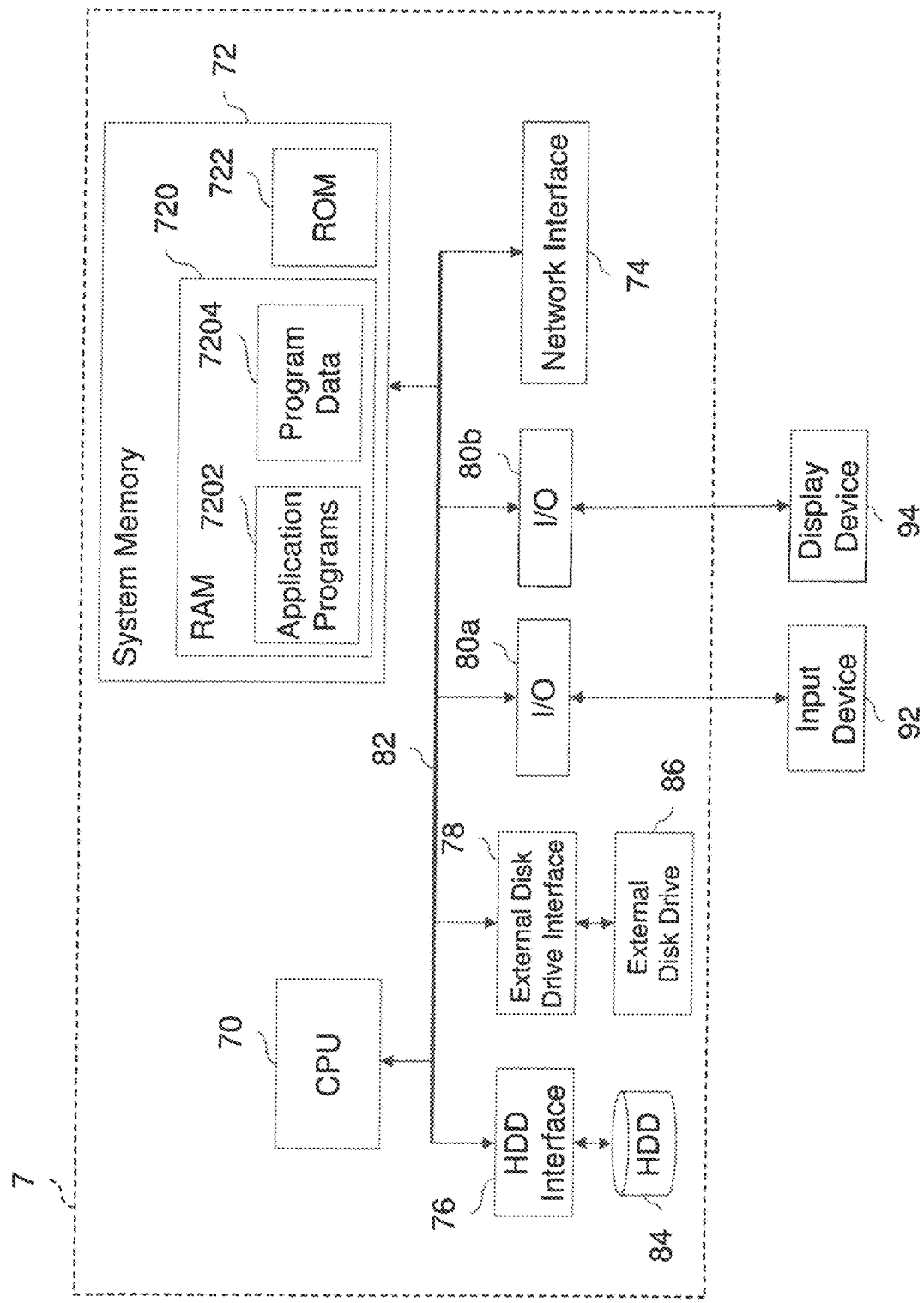
FIG. 7 shows an exemplary hardware configuration of a computer that may be used to implement exemplary embodiments and variations as described herein.

FIG. 7 shows an exemplary hardware configuration of a computer that may be used to implement exemplary embodiments and variations as described herein.

The computer 7 shown in FIG. 7 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 7, the computer 7 may further be connected to a printer and/or an imaging device such as a camera, via corresponding I/O interfaces and the system bus 82.

In addition or as an alternative to an implementation using a computer 7 as shown in FIG. 7, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A computer-implemented method for secure data sharing, comprising:
   storing, by a data owner or an entity authorized by the data owner, via a data management user interface, in a decentralized data storage, data in an encrypted format;
   storing, via the data management user interface, in a blockchain, information indicating the data owner and a reference to a location of the data stored in the decentralized data storage;
   receiving, via the data management user interface, a user input from the data owner;
   performing a modification, via the data management user interface and based on the user input, of identities of one or more authorized users or access control information indicating specified actions which are authorized to be performed by specified individuals of the one or more authorized users;
   storing, by the data owner, via the data management user interface, in the blockchain, information received via the user input from the data owner, the information indicating consent given to one or more authorized users for using the data, the consent indicating:
     the identities of the one or more authorized users,
     one or more time periods during which the one or more authorized users are authorized to access the data,
     the access control information indicating specified actions which are authorized to be performed by specified individuals of the one or more authorized users, and
     the modification of the identities of the one or more authorized users or the access control information;
   receiving, via the data management user interface, an input from a particular authorized user of the one or more authorized users to perform an action on the data stored in the decentralized data storage in response to determining that the particular authorized user has the consent to perform the action; and
   accessing, via the data management user interface, the decentralized data storage to perform the action on the data stored in the decentralized data storage in response to obtaining the reference to the location of the data and further in response to determining that authorized user has the consent to perform the action.

2. The computer-implemented method according to claim 1, wherein one of the one or more authorized users is the entity authorized by the data owner to store the data in the decentralized data storage.

3. The computer-implemented method according to claim 2, further comprising:
   receiving, via the data management user interface, a request from a data requester to enable use of the data stored in the decentralized data storage;
   determining, via the data management user interface, with reference to the blockchain, whether the data requester is the data owner or one of the one or more authorized users; and
   when the data requester is determined to be the data owner or one of the one or more authorized users, retrieving the data for use by the data requester, via the data management user interface, from the decentralized data storage, using the reference to the data.

4. The computer-implemented method according to claim 3,
   wherein the method further comprises:
   when the data requester is determined to be one of the one or more authorized users,
   determining, via the data management interface, with reference to the blockchain, whether a current time is within the time period in which said one of the one or more authorized users is allowed to use the data; and
   retrieving the data for use by the data requester, via the data management user interface, from the decentralized data storage, when the current time is determined to be within the time period in which said one of the one or more authorized users is allowed to use the data.

5. The computer-implemented method according to claim 1, further comprising:
  storing, by the data owner, via the data management user interface, in the blockchain, information indicating cancellation of the consent given to at least one of the one or more authorized users,
  wherein, the data is not made available for use by the data requester in case the data requester is said at least one of the one or more authorized users for whom the consent is cancelled.

6. The computer-implemented method according to claim 1, further comprising:
  decrypting, via the data management user interface, the retrieved data using a key used for encrypting the data stored in the decentralized data storage.

7. The computer-implemented method according to claim 6, further comprising:
  when storing the information indicating consent given to the one or more authorized users,
  encrypting using a key of each of the one or more authorized users, the key used for encrypting the data stored in the decentralized data storage, wherein the key of each of the one or more authorized users may be a public key of each of the one or more authorized users; and
  storing the encrypted key in the blockchain together with the information indicating consent given to the one or more authorized users.

8. The computer-implemented method according to claim 6, wherein the key used for encrypting the data stored in the decentralized data storage is exchanged according to Diffie-Hellman key exchange.

9. The computer-implemented method according to claim 6, further comprises:
  encrypting the data, via the data management user interface, using a key of each of the one or more authorized users before storing the data in the decentralized data storage, wherein the key of each of the one or more authorized users may be a public key of each of the one or more authorized users.

10. The computer-implemented method according to claim 1, wherein the decentralized data storage is implemented according to InterPlanetary File System™, IPFS, protocol; and
  wherein the reference to the data is a hash of the data obtained according to the IPFS protocol.

11. The computer-implemented method according to claim 6, wherein the decentralized data storage is implemented using one of the following:
  Filecoin™,
  Sia™;
  Storj™; or
  Swarm™.

12. The computer-implemented method according to claim 1, wherein an electronic device of the data owner and/or the data requester comprises the data management user interface.

13. A client device for secure data sharing, the client device comprising at least a processor to implement a data management interface adapted to:
  store, by a data owner or an entity authorized by the data owner, in a decentralized data storage, data in an encrypted format;
  store, in a blockchain, information indicating the data owner and a reference to the data stored in the decentralized data storage;
  receive a user input from the data owner;
  perform a modification, based on the user input, of identities of one or more authorized users or access control information indicating specified actions which are authorized to be performed by specified individuals of the one or more authorized users;
  store, by the data owner, in the blockchain, information received via the user input from the data owner indicating consent given to one or more authorized users for using the data, the consent indicating:
    the identities of the one or more authorized users,
    one or more time periods during which the one or more authorized users are authorized to access the data,
    the access control information indicating specified actions which are authorized to be performed by specified individuals of the one or more authorized users, and
    the modification of the identities of the one or more authorized users or the access control information;
  receive an input from a particular authorized user of the one or more authorized users to perform an action on the data stored in the decentralized data storage in response to determining that the particular authorized user has the consent to perform the action; and
  access the decentralized data storage to perform an action on the data stored in the decentralized data storage, based on the user input, in response to obtaining the reference to the location of the data and further in response to determining that authorized user has the consent to perform the action.

14. The client device according to claim 13, wherein one of the one or more authorized users is the entity authorized by the data owner to store the data in the decentralized data storage.

15. The client device according to claim 14, the data management interface further adapted to:
  receive, via the data management user interface, a request from a data requester to enable use of the data stored in the decentralized data storage;
  determine, via the data management user interface, with reference to the blockchain, whether the data requester is the data owner or one of the one or more authorized users; and
  when the data requester is determined to be the data owner or one of the one or more authorized users, retrieve the data for use by the data requester, via the data management user interface, from the decentralized data storage, using the reference to the data.

16. The client device according to claim 15,
  wherein the data management interface is further adapted to:
  when the data requester is determined to be one of the one or more authorized users,
  determine, via the data management interface, with reference to the blockchain, whether a current time is within the time period in which said one of the one or more authorized users is allowed to use the data; and
  retrieve the data for use by the data requester, via the data management user interface, from the decentralized data storage, when the current time is determined to be within the time period in which said one of the one or more authorized users is allowed to use the data.

17. The client device according to claim 13, the data management interface further adapted to:
  store, by the data owner, via the data management user interface, in the blockchain, information indicating cancellation of the consent given to at least one of the one or more authorized users, wherein, the data is not made available for use by the data requester in case the data requester is said at least one of the one or more authorized users for whom the consent is cancelled.

18. A non-transitory storage medium comprising computer-readable instructions which are executable by a computing device to:

store, by a data owner or an entity authorized by the data owner, via a data management user interface, in a decentralized data storage, data in an encrypted format;

store, via the data management user interface, in a blockchain, information indicating the data owner and a reference to a location of the data stored in the decentralized data storage;

receiving, via the data management user interface, a user input from the data owner;

performing a modification, via the data management user interface and based on the user input, of identities of one or more authorized users or access control information indicating specified actions which are authorized to be performed by specified individuals of the one or more authorized users;

store, by the data owner, via the data management user interface, in the blockchain, information received via the user input from the data owner, the information indicating consent given to one or more authorized users for using the data, the consent indicating:

the identities of the one or more authorized users, one or more time periods during which the one or more authorized users are authorized to access the data, the access control information indicating specified actions which are authorized to be performed by specified individuals of the one or more authorized users, and the modification of the identities of the one or more authorized users or the access control information;

receiving, via the data management user interface, an input from a particular authorized user of the one or more authorized users to perform an action on the data stored in the decentralized data storage in response to determining that the particular authorized user has the consent to perform the action; and accessing, via the data management user interface, the decentralized data storage to perform the action on the data stored in the decentralized data storage in response to obtaining the reference to the location of the data and further in response to determining that authorized user has the consent to perform the action.

19. The non-transitory storage medium according to claim 18, wherein one of the one or more authorized users is the entity authorized by the data owner to store the data in the decentralized data storage.

20. The non-transitory storage medium according to claim 19, wherein the computer-readable instructions are further executable by the computing device to:

receive, via the data management user interface, a request from a data requester to enable use of the data stored in the decentralized data storage;

determine, via the data management user interface, with reference to a consent stored in the blockchain, whether the data requester is the data owner or one of the one or more authorized users, the consent stored in the blockchain indicating the identities of the one or more authorized users and access control information indicating specified actions which are authorized to be performed by specified individuals of the one or more authorized users; and when the data requester is determined to be the data owner or one of the one or more authorized users, retrieve the data for use by the data requester, via the data management user interface, from the decentralized data storage, using the reference to the data.

* * * * *